Jan. 31, 1967    YOSHITO INOUE    3,301,448
PACKAGE CARRIER

Filed Nov. 3, 1964    2 Sheets-Sheet 2

INVENTOR
YOSHITO INOUE
BY Emory L. Groff Jr.
ATTORNEY

United States Patent Office 3,301,448
Patented Jan. 31, 1967

3,301,448
PACKAGE CARRIER
Yoshito Inoue, Tokyo, Japan, assignor to Honda Giken Kogyo Kabushiki Kaisha, Tokyo, Japan, a corporation of Japan
Filed Nov. 3, 1964, Ser. No. 408,539
Claims priority, application Japan, Mar. 25, 1964, 39/22,438, 39/22,439
7 Claims. (Cl. 224—32)

This invention relates generally to a package carrier and more particularly, to a receptacle of the wire-basket type, adapted to be manually transported from place to place and including means providing for the removable attachment of the basket to a suitable supporting base member.

The present invention concerns a carrier particularly adapted to be used in conjunction with a wheeled vehicle, such as a bicycle or motorcycle. Numerous types of wire-basket package carriers are known for use on wheeled vehicles; however, most of these are assembled integrally with the body of the vehicle or are attached thereto by various means such as bolts, straps, etc. A highly desirable feature to be found in a carrier intended for the above-mentioned use is that means be provided permitting the ready removal and replacement of the carrier from the vehicle so that the owner may utilize the carrier not only to transport articles while operating the vehicle, but also may utilize the carrier as a basket or container while not operating the vehicle, such as would be the case when the owner goes shopping and desires a suitable means for carrying and supporting a plurality of packages.

A problem incident with the transport of packages in most of the known types of carriers mounted on wheeled vehicles, is that of providing suitable means for securing the articles within the container to prevent shifting or jostling of the packages while the vehicle is in motion. This problem is particularly critical in the case of a wheeled vehicle such as a bicycle or a motorcycle, in view of the known tendency of such vehicles to lean heavily while making turns and to bounce up and down quite vigorously, especially when travelling over rough or unimproved roads. The present invention overcomes this problem by providing novel hold-down means for securing the packages within the carrier, which hold-down means also serves as handles for the carrier when it is being used remote from the vehicle.

Accordingly, one of the primary objects of the present invention is to provide a package carrier of the wire-basket type adapted to be quickly and removably attached to a supporting base on a vehicle, without the necessity of utilizing any tools or separate fastening device.

Another object of the present invention is to provide a package carrier of the wire-basket type, including carrying handles adapted to be regulated to serve as hold-down means for securing articles within the carrier.

Still another object of the present invention is to provide a package carrier including locking means for securing the handles thereof in a hold-down position.

A further object of the present invention is to provide a package carrier having pivotal spring-urged locking means for removably attaching the carrier to a supporting base.

With these and other objects in view which will more readily appear as the nature of the invention is better understood, the invention consists in the novel construction, combination, and arrangement of parts hereinafter more fully described, illustrated, and claimed.

A preferred and practical embodiment of the invention is shown in the accompanying drawings in which:

FIGURE 3 is a top plan view of the upper portion of the package carrier with the remaining structure thereof omitted for purposes of clarity.

FIGURE 4 is a side elevation of the package carrier shown attached to a supporting frame.

Similar reference characters designate corresponding parts throughout the several figures of the drawings.

Figure 1:
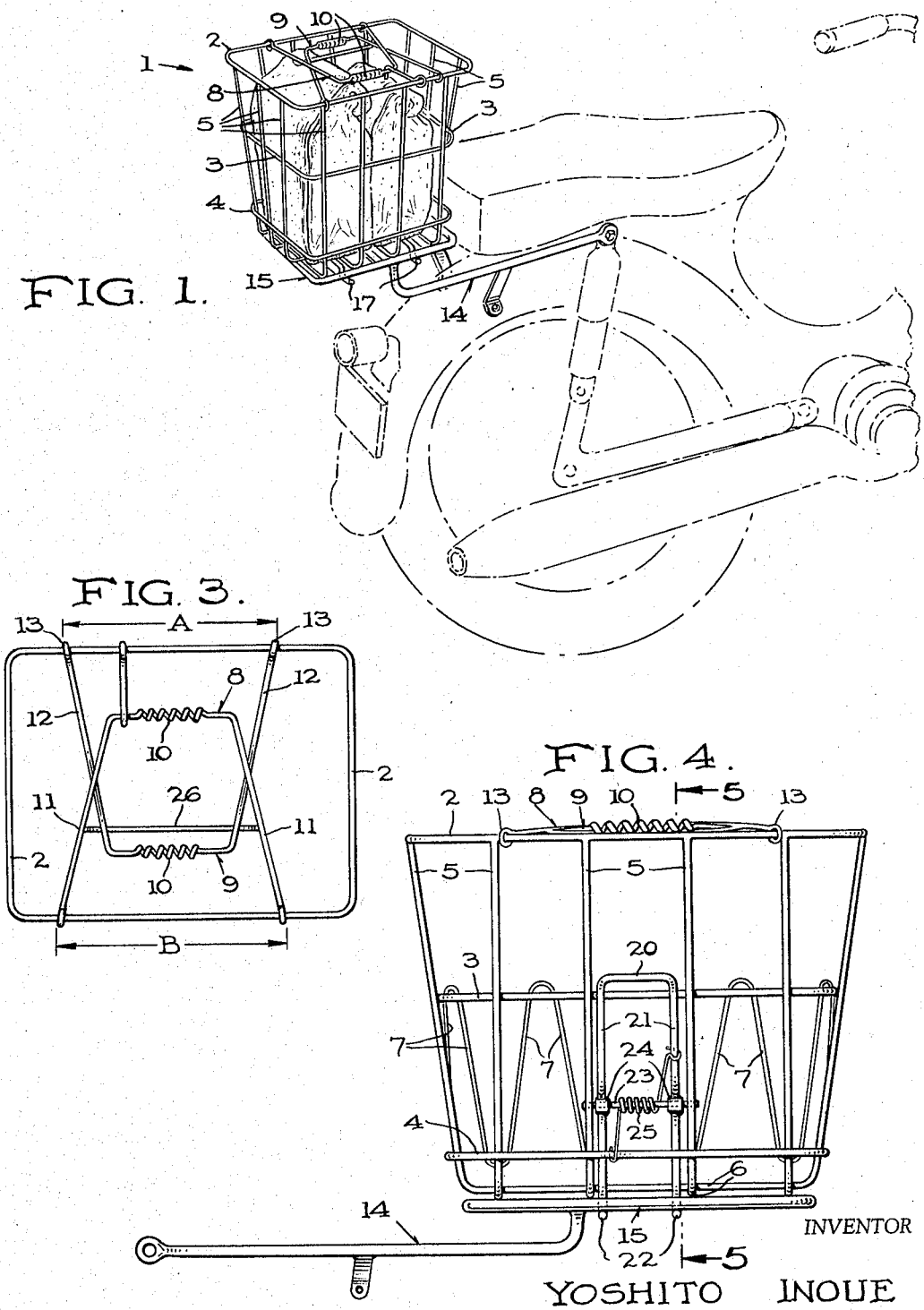
FIGURE 1 is a perspective view of the package carrier according to the present invention, as shown in a locked position upon a supporting frame attached to a motor vehicle.

In the illustrated embodiment of the present invention, the package carrier is shown as constructed of spaced-apart wire members, and as shown in FIGURE 1, the carrier is illustrated in combination with a supporting frame for releasably attaching the carrier to the rear of a motor vehicle. It will be understood that the present invention is not limited to a package carrier formed solely of wire stock, but may be constructed of any other suitable type of material which will achieve the same results as set forth hereinafter.

Likewise, the supporting frame to which the package carrier is releasably attached, may be associated with any other type of fixed or mobile device other than the two-wheeled vehicle shown in phantom lines in FIGURE 1.

Figure 2:
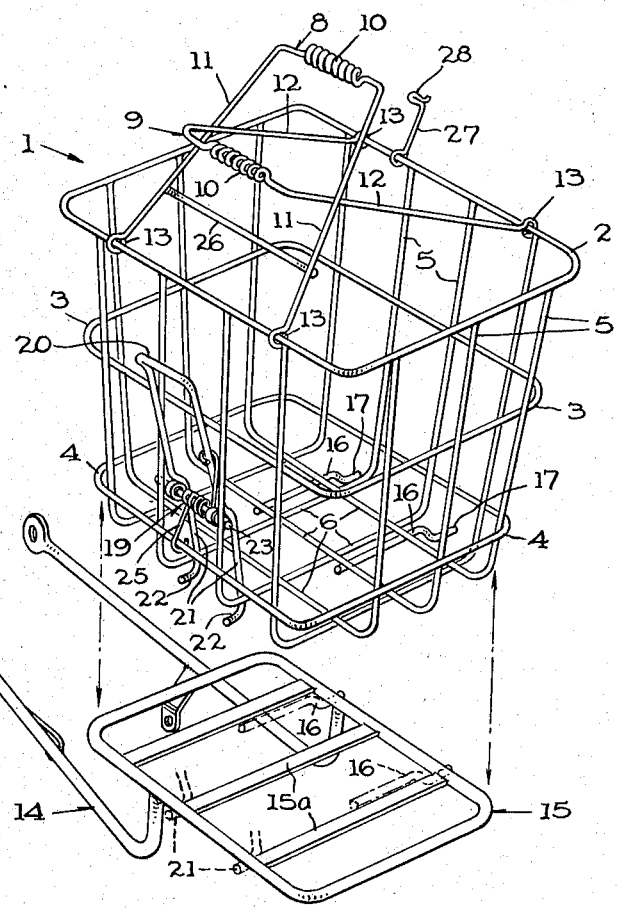
FIGURE 2 is a perspective view of the package carrier and supporting frame shown in FIGURE 1, with the carrier detached from the frame.

Referring now more particularly to the drawings, FIGURES 1 and 2 most clearly illustrate the wire basket or receptacle, generally designated 1, forming the package carrier. The carrier 1 is most preferably constructed of a plurality of horizontally and vertically disposed wire bars or rails, connected to one another by any suitable means such as welding or brazing to provide a three-dimensional receptacle of appropriate size an capacity. As will be most clearly seen in FIGURES 4 and 5, the long and short side walls are preferably inclined inwardly from the top to the bottom of the basket, so that the resultant overall configuration of the basket is that of an inverted, truncated, rectangular pyramid.

Referring to the construction of the basket 1 in greater detail, it comprises a top rail 2, a side or intermediate rail 3, and bottom rail 4 disposed parallel to one another in a spaced-apart relationship. A plurality of U-shaped reinforcing members each including a pair of oppositely disposed vertical rails 5 connected by means of a horizontal web or base member 6 are spaced substantially equidistantly around the perimeter of the top, intermediate and bottom rails as most clearly illustrated in FIGURE 2, and securely joined to one another at their points of intersection by any suitable means such as welding. For maximum strength, the intermediate rail 3 is preferably disposed within the vertical rails 5, while the bottom rail 4 is attached to the outer side of the vertical rails 5.

To further strengthen the above-described assembly, an undulating or sinuous filler wire 7 is attached in a secure manner to the inner surface of the intermediate rail 3 and bottom rail 4. Besides affording additional strength to the completed wire basket 1, the filler wire 7 is disposed in a manner designed to bridge the gap or opening formed between each pair of adjacent spaced-apart vertical rails 5 in order to permit the placing of rather small articles within the carrier without the risk of their passing between any two spaced-apart rails 5.

A pair of carrying handles, generally designated 8 and 9 are pivotally attached along the opposite long sides of the top rail 2. The arrangement of these handles will be most apparent from a review of FIGURES 2 and 3, wherein it will be seen that the handles 8 and 9 are formed in a trapezoidal shape and provided along their narrow overlapping ends with hand grips 10, 10. Preferably, the hand grips 10 are formed by a helical winding of the wire stock used in constructing the handles 8 and 9, the convolutions of which are large enough to afford a positive and comfortable feel to the hand of the person using the package carrier. As will be most clearly seen from FIGURE 3, the divergent side legs 11 of the carrying handle 8 are spread apart at their free ends a distance slightly greater than the space between the free ends of the side legs 12 included in the handle 9. This is represented by the distance indicated B, which it will be understood is somewhat greater than the distance indicated as A. The reason for this difference in the divergency of the legs 11 and 12 will be readily apparent from the explanation which follows.

The two handles 8 and 9 are maintained in their oppositely disposed relationship as a result of the manner of limiting the lateral position or movement of the free ends 13 of the side legs 11 and 12. With reference to FIGURE 2, it will be seen that the ends 13 are bent around the top rail 2 in susch manner as to provide a freely pivotal connection to each of the four free ends 13. Each pair of free ends 13 is disposed between a pair of outwardly adjacent vertical rails 5 so that it will be seen that each of the handles 8 and 9 is boxed in between a pair of vertical rails 5.

In order to use the package carrier apart from the vehicle when manually moving from place to place, the user merely picks up the two hand grips 10, bringing them together at a point above the plane at the top rail 2, and grasps both of the juxtaposed grips 10 in one hand to transport the package carrier.

The present invention provides novel means for anchoring the wire basket 1 upon a suitable supporting frame, generally designated 14, which is shown by way of example attached to the rear of a motor vehicle, such as a motorcycle shown in FIGURE 1. When the user desires to transport the package carrier through the agency of the supporting frame 14, means must be provided for securely and releasably attaching the wire basket 1 to the frame 14. Accordingly, the frame 14 includes a base rail 15 of the same general configuration as the bottom portion of the wire basket 1, but constructued of substantially heavier bar or tubular stock than any of the wire members comprising the basket. A pair of spaced-apart mounting bars 16, 16 are attached to the bottom members 6 beneath the basket 1 in a laterally spaced-apart relationship. A free end of each of the mounting bars 16 projects outwardly and downwardly from the remainder of the bar 16 to provide a hook-catch 17 forming a base rail-receiving notch 18 immediately beneath the vicinity of the juncture of the vertical rails 5 and their bottom base members 6, as most clearly seen in FIGURE 5.

When it is desired to securely attach the wire basket 1 to the supporting frame 14, the basket is lowered onto the base rail 15 and tilted silightly so as to insert the free end of the hook-catches 17 underneath one of the long sides of the base rail 15 so that the rail 15 will be wedged into the notch 18 formed by the curved hook-catches 17. After accomplishing the foregoing, the opposite long side of the basket is lowered onto the opposite long side of the base rail 15. As this second side of the basket is lowered onto the rail 15, a releasable locking assembly, generally designated 19, is actuated in a manner to provide for positive locking of the basket to the supporting frame 14.

The locking assembly 19 comprises a generally inverted U-shaped wire member including a lock handle 20 and a depending pair of curved lock bars 21 formed at their lower ends with a pair of outwardly projecting movable catches 22. The locking assembly 19 is pivotally attached substantially at its mid-section to a cross bar 23 secured to a pair of vertical rails 5 disposed adjacent to each of the lock bars 21. The pivotal attachment is preferably provided by means of a pair of collars or sleeves 24 loosely journalled about said cross bar 23 on the one hand and fixedly attached to the lock bars 21 on the other. Suitable spring means 25 are provided to normally urge the locking assembly 19 to the locked position, as shown in full lines in FIGURE 5, whereupon it will be seen that when in this locked position, the lock bars 21 in the vicinity of the lock handle 20 will abut the adjacent intermediate rail 3 at the same time the movable catches 22 at the opposite ends of the lock bars 21 are disposed beneath the juncture of the vertical rails 5 and their respective base members 6.

Figure 5:
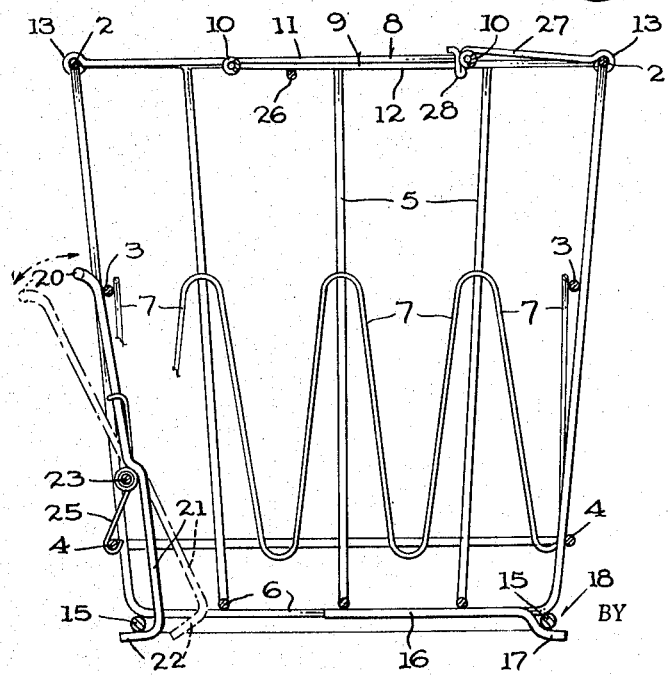
FIGURE 5 is a vertical sectional view taken along the line 5—5 of FIGURE 4, and illustrating in phantom lines the alternate position of the releasable locking assembly.

By manually grasping the lock handle 20 and pivoting it to the dotted line position as shown in FIGURE 5, against the force of the spring 25, the catches 22 will be swung inwardly whereupon it will be seen that the side of the basket to which the locking assembly is connected may then be lowered upon the juxtaposed base rail 5. When the bottom of the basket rests upon the base rail 15 the lock handle 20 is released and driven to the full line position of FIGURE 5 by the spring means 25, thereby causing the movable catches 22 to engage the undersurface of the juxtaposed base rail 14 to securely anchor the package carrier to the supporting frame 14.

The free ends of both the fixed catches 17 and the movable catches 22 are disposed in a slightly downwardly inclined position with respect to the horizontal plane of the base rail 15 so that there will be formed gradually diminishing notches between the catches and the bottom or base members of the basket to provide a camming action insuring a more positive and secure attachment of the basket to the supporting frame.

As will be seen in FIGURE 2, a plurality of flat support rails 15a span the opening between the opposite long sides of the base rail 15 to serve as a support for the long base members 6 on the bottom of the basket. In addition, these rails 15a act as positioning means to orient the basket as it is lowered onto, and secured to the frame 14. As shown, the mounting bars 16 are spaced on the bottom of the basket so that when lowered onto the base rail 15 they will just fit between the two outermost support rails 15a with only minimum clearance therebetween. In this manner, the bars 16 will be boxed in to prevent longitudinal displacement of the basket when mounted on the frame 14.

When utilizing the package carrier of the present invention in combination with supporting means such as shown mounted on a motor vehicle, it is quite imperative that movable means be provided for insuring that the contents being transported within the carrier are not shaken or bounced out of the wire basket as a result of shocks imparted thereto through movement of the vehicle. Accordingly, it will be seen that the carrying handles 8 and 9 serve a dual purpose since after the wire basket 1 has been carried to, and securely mounted upon, the supporting frame 14, the very same handles 8 and 9 are arranged to provide suitable hold-down means for preventing the contents of the carrier from being accidentally discharged during movement thereof.

Spanning the divergent legs 11 of the carrying handle 8 is a hold-down bar 26 medially disposed between the hand grip 10 and the top rail 2 and parallel thereto. An important feature of the hold-down bar 26 is that although disposed parallel to the hand grip 10 and the adjacent top rail, it is not in the same plane as the legs 11, but is disposed in a plane lower than the legs 11 when the carrying handles are in the hold-down position as shown in FIGURES 1, 3, and 5. This off-set relationship of the hold-down bar 26 is perhaps most clearly shown in the sectional view of FIGURE 5. When it is desired to engage the carrying handles 8 and 9 in the hold-down position, the hand grip 10 of the handle 9 is passed between the legs 11 of the handle 8, as will be most clearly seen in FIGURE 2. In view of the loose pivotal connection formed by the free ends 13 of the carrying handle legs, mere gravity will cause the handles to fall into the flat or horizontal position of FIGURES 1, 3, 4, and 5, whereupon it will be seen that the legs 12 of the handle 9 will be supported upon the top surface of the hold-down bar 26. By forming the offset or lowered portion of the hold-down bar 26 in a plane which is disposed beneath the adjacent legs 11 a distance which is at least as great as the thickness of the wire stock forming the legs 12, it will be seen that the two handles 8 and 9 will be disposed substantially in a single horizontal plane spanning the distance between the opposite long sides of the top rail 2.

The foregoing construction which permits the interlocking feature of the two handles will, of course, depend upon the relative length of the handle legs 11 and 12. In order to insure the overlapping of the two hand grips 10 to achieve the desired interlocking action, it will follow that the handles 8 and 9 must each extend no less than one-half the distance across the top basket opening. Thus the disposed handles 8 and 9 are securely retained in the above-described hold-down position by means of a hold-down catch 27 pivotally attached at one end to the top rail 2 between the legs 12 of the carrying handle 9. The opposite free end of the hold-down catch 27 is provided with any suitable positive snap-acting catch means such as the offset hook or projection 28 as shown in FIGURE 2. The hold-down catch 27 is engaged by swinging the offset projection 28 over to the carrying handle 8 and snapping the projection 28 around the handle 8 adjacent its hand grip 10. If desired, the end of the projection 28 may be slightly enlarged and/or the distance of the projection 28 from its adjacent top rail 2 may be slightly less than the distance of the hand grip 10 of the handle 8 from the opposite top rail 2 so that a force fit or positive snap action will be achieved when the hold-down catch 27 is engaged, thereby precluding the accidental release of the catch 27 should the wire basket 1 receive any severe shock or bumping during transport thereof.

When it is desired to remove the contents from the package carrier, it is necessary merely to release the hold-down catch 27 by pivoting the offset projection 28 thereof away from its resilient engagement with the carrying handle 8, whereupon the two hand grips 10 may be elevated to either carry away the wire basket 1 from its supporting frame 14, or to remove contents of the wire basket. If it is desired to remove the basket from the frame, then the lock handle 20 is gripped to swing it to the release position as shown in dotted lines in FIGURE 5, whereupon the adjecent side of the basket may be lifted from the base rail 15 of the frame 14 prior to the removal of the opposite side of the wire basket to disengage the hook catches 17 from their adjacent side of the base rail 15.

As most clearly shown in FIGURE 5, the bottom of both the fixed hook catches 17 and the movable catches 22 are disposed in a single horizontal plane parallel to the bottom members 6 when the locking assembly 19 is in its normal at rest position thereby providing a total of four spaced-apart base members or feet serving to support the basket in a level condition when it is placed directly upon a flat surface such as a table, floor, etc.

It is to be understood that the invention is not limited to the specific features shown, but that the means of construction herein disclosed comprise the preferred form of several modes of putting the invention into effect and the invention is therefore clear in any of its forms or modifications within the legitimate and valid scope of the appended claims.

I claim:
1. The combination including, a basket having a pair of carrying handles pivotally connected to the top thereof, each of said handles including a pair of legs each of which extends to a distance greater than one-half the width of the basket, hold-down means intermediately disposed on one pair of said legs, said handles adapted to be pivoted alternately from a raised carrying position to a lowered substantially horizontal position spanning the top of the basket with one of said handles interlocking with the other of said handles to engage said hold-down means; and a frame including a base rail adapted to engage and support the bottom of said basket, said basket having manipulable locking means on the bottom thereof releasably engageable with said base rail to attach the basket to said frame.

2. A carrier comprising, a basket having an open top, a pair of carrying handles pivotally attached by means of a pair of legs to opposite sides of the top of said basket, each of said handles including a hand grip at the ends of its pair of legs opposite that attached to said basket, each of said hand grips spaced from its respective pivotal attachment a distance greater than one-half the distance across said basket top openings, hold-down means intermediately disposed on one pair of said legs, whereby, said handles may be pivoted from a raised carrier position to a lower position parallel to the top of said basket with one of said handles interlocking with the other of said handles to engage said hold-down means, and catch means pivotally attached to the top of said basket at one side thereof and engageable with said handle pivoted to the opposite side of said basket when said handles are in said lowered position.

3. A carrier according to claim 2, wherein, each two legs of said pairs of legs extends in a divergent direction from said hand grip to the side of said basket, and said hold-down means comprises a bar transversely disposed between said legs of one of said handles, whereby, when said handles are lowered one of said hand grips passes between said legs of the handle provided with said bar to overlie same.

4. A carrier according to claim 3, wherein, said legs of said handle having said bar are divergent a greater amount than said legs of the other of said handles.

5. The combination according to claim 1, wherein, said manipulable locking means includes, a lock bar pivotally attached to one side of said basket, handle means on said lock bar, and spring means urging said bar to a locked position.

6. The combination according to claim 5, wherein, the bottom of said basket includes fixed catch means oppositely disposed from said manipulable catch means.

7. The combination according to claim 6, wherein, said frame includes positioning means in abutment with said fixed catch means preventing lateral movement of said basket when both of said catch means engage said base rail.

References Cited by the Examiner

UNITED STATES PATENTS

| | | | |
|---|---|---|---|
| 1,123,453 | 1/1915 | Witte | 224—45.14 |
| 1,303,854 | 5/1919 | Clark | 214—515 |
| 1,950,376 | 3/1934 | Alexander. | |

FOREIGN PATENTS

| | | |
|---|---|---|
| 1,209,057 | 9/1959 | France. |
| 743,029 | 1/1956 | Great Britain. |
| 238,775 | 11/1945 | Switzerland. |

GERALD M. FORLENZA, *Primary Examiner.*

J. E. OLDS, *Assistant Examiner.*